C. S. Bell,
Sectional Steam Boiler.
N° 58,017. Patented Sep. 11, 1866.
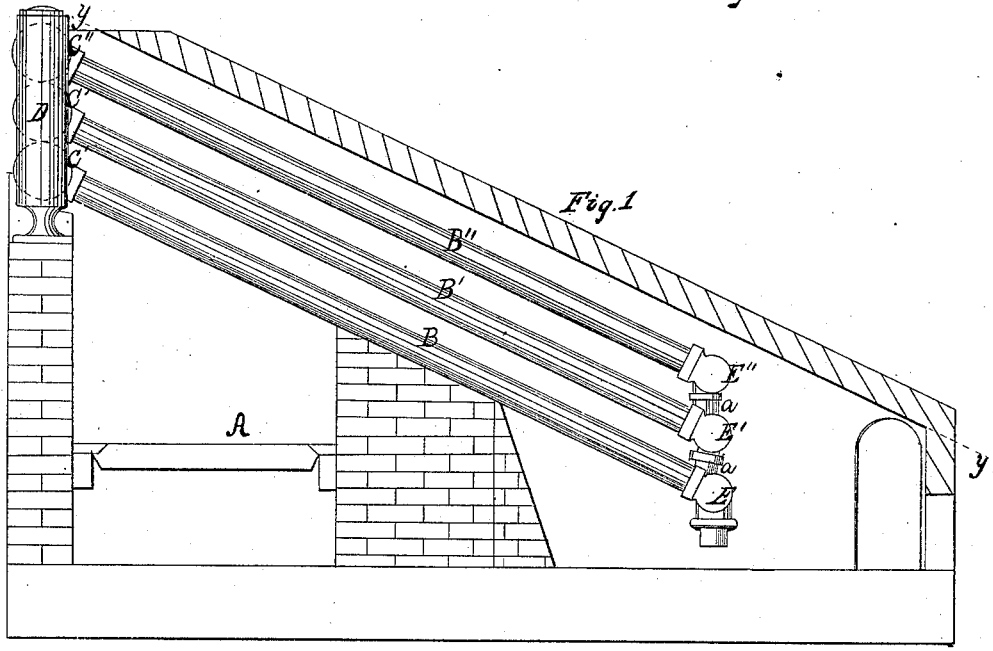
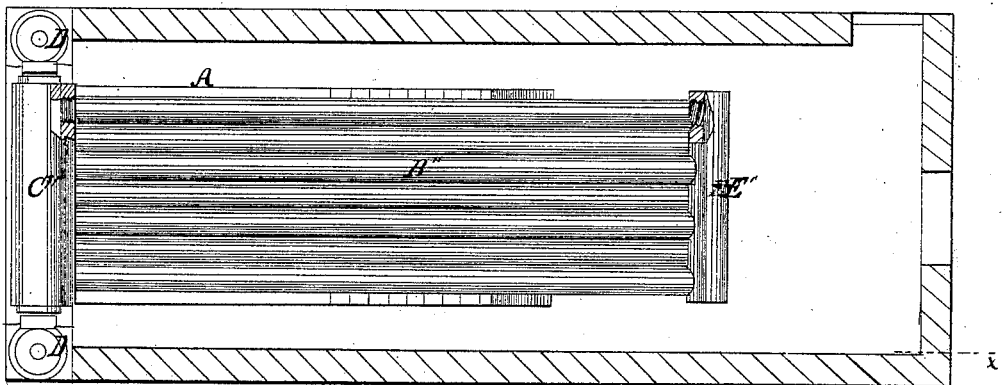

UNITED STATES PATENT OFFICE.

C. S. BELL, OF HILLSBOROUGH, OHIO, ASSIGNOR TO HIMSELF AND JOSEPH K. MARLAY, OF SAME PLACE.

IMPROVEMENT IN STEAM-GENERATORS.

Specification forming part of Letters Patent No. 58,017, dated September 11, 1866.

*To all whom it may concern:*

Be it known that I, C. S. BELL, of Hillsborough, Highland county, State of Ohio, have invented a new and Improved Steam-Generator; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, Fig. 2; Fig. 2, a horizontal section of the same, taken in the line $y\ y$, Fig. 1.

Similar letters of reference indicate like parts.

This invention relates to a new and improved apparatus for generating steam, and has for its object economy in fuel, safety from explosions, and an economical mode of construction.

A represents a fire-chamber, inclosed by suitable masonry or metal walls, and B B' B'' represent three rows of tubes, or any desired number, placed one row above the other, and having an inclined position, as shown in Fig. 1. These tubes may be constructed of wrought or cast iron, or other suitable material, the former material being preferable. These tubes have screw-threads cut on their ends, those at one end being right and those at the other end left hand threads. These tubes screw at one end into sections C C' C'', which are simply short horizontal pipes of larger diameter than the tubes B, a row of tubes being screwed into each pipe or section, and the ends of these pipes or sections are connected to and communicate with upright tubular posts D D, which communicate with the steam-dome by means of suitable pipes. The other ends of the tubes B B' B'' screw into horizontal sections or pipes E E' E'', which may be about equal in diameter to the tubes, and these sections or pipes are connected by short tubes or nipples $a$, provided with right and left screws to work into holes in the sections or pipes E E' E'', tapped with corresponding threads.

The sections or pipes E E' E'' are at the lower or depressed ends of the tubes B B' B'', and the water enters the lower section or pipe E, and the lower section or pipe C at the elevated ends of the tubes is designed to be below the water. These sections or pipes may be of cast-iron, and the upper sections or pipes are larger in diameter than the tubes and lower sections or pipes, in order that a free or uninterrupted flow of water may be kept up, and to admit of plenty of steam room. The heat from the fire-chamber passes entirely around all of the tubes, so that a large surface is exposed to the heat.

The material can be much thinner and yet much stronger than any other present known form of steam-generator, and a less cost of construction and economy in fuel are the result.

The manner of fitting the parts together by right and left hand screws greatly facilitates the construction or putting up of the device, and the apparatus may be used with a very small supply of water, say, two and a half gallons to a horse-power.

Having thus described my invention, I claim as new and desire to secure by Letters Patent—

The tubes B B' B'', arranged in rows one above the other and over the fire-chamber A, as shown, in combination with the sections or pipes C C' C'' and E E' E'', constructed, arranged, and applied substantially in the manner as and for the purpose set forth.

C. S. BELL.

Witnesses:
ALLEN HELLAMELL,
JNO. DILL.